US 8,839,006 B2

(12) United States Patent
Li et al.

(10) Patent No.: US 8,839,006 B2
(45) Date of Patent: Sep. 16, 2014

(54) POWER CONSUMPTION REDUCTION SYSTEMS AND METHODS

(75) Inventors: Sau Yan Keith Li, Sunnyvale, CA (US); Thomas Edward Dewey, Menlo Park, CA (US); Saket Arun Jamkar, Woburn, MA (US); Amit Parikh, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 664 days.

(21) Appl. No.: 12/790,727

(22) Filed: May 28, 2010

(65) Prior Publication Data

US 2011/0291748 A1     Dec. 1, 2011

(51) Int. Cl.
*G06F 1/10*       (2006.01)
*G06F 1/32*       (2006.01)

(52) U.S. Cl.
CPC .............. *G06F 1/3228* (2013.01); *Y02B 60/32* (2013.01); *G06F 1/3287* (2013.01)
USPC ........... 713/300; 713/310; 713/320; 713/321; 713/322; 713/323; 713/324; 713/330; 713/340; 327/544

(58) Field of Classification Search
CPC ...... G06F 1/3228; G06F 1/3287; Y02B 60/32
USPC ................. 713/300, 310, 320–324, 330, 340; 327/544
See application file for complete search history.

(56) References Cited

U.S. PATENT DOCUMENTS

| 4,335,445 A | 6/1982 | Nercessian |
|---|---|---|
| 4,544,910 A | 10/1985 | Hoberman |
| 4,679,130 A | 7/1987 | Moscovici |
| 4,706,180 A | 11/1987 | Wills |
| 4,739,252 A | 4/1988 | Malaviya et al. |
| 4,868,832 A | 9/1989 | Marrington et al. |
| 4,893,228 A | 1/1990 | Orrick et al. |

(Continued)

FOREIGN PATENT DOCUMENTS

| EP | 0381021 | 8/1990 |
|---|---|---|
| EP | 0474963 | 3/1992 |

(Continued)

OTHER PUBLICATIONS

"Computer Software", Wikipedia, http://en.wikipedia.org/wiki/software, retrieved May 2, 2007.

(Continued)

*Primary Examiner* — M Elamin

(57) ABSTRACT

Power management systems and methods that facilitate efficient and effective power conservation are presented. In one embodiment a power management method comprises: performing an initiation metric determination process, and adjusting operations of a logic component based on said threshold value. In one exemplary implementation, the initiation metric determination process includes monitoring activity of a logic component, and establishing a power conservation initiation threshold value. The initiation metric determination process can include performing a system architecture characteristic analysis in which a system architecture power-consumption break-even time (BE) is determined for the system. The initiation metric determination process can also include performing a system utilization analysis process is performed in which idle period durations detected during said monitoring are sorted into a variety of different length intervals and analyzed accordingly. Histograms of idle period durations can be collected. Adjusting operations can include entering a low power state.

17 Claims, 7 Drawing Sheets

(56) References Cited

U.S. PATENT DOCUMENTS

| | | |
|---|---|---|
| 5,086,501 A | 2/1992 | DeLuca et al. |
| 5,103,110 A | 4/1992 | Housworth et al. |
| 5,167,024 A | 11/1992 | Smith et al. |
| 5,177,431 A | 1/1993 | Smith et al. |
| 5,201,059 A | 4/1993 | Nguyen |
| 5,204,863 A | 4/1993 | Saint-Joigny et al. |
| 5,218,704 A | 6/1993 | Watts, Jr. et al. |
| 5,218,705 A | 6/1993 | DeLuca et al. |
| 5,230,055 A | 7/1993 | Katz et al. |
| 5,239,652 A | 8/1993 | Seibert et al. |
| 5,254,878 A | 10/1993 | Olsen |
| 5,300,831 A | 4/1994 | Pham et al. |
| 5,307,003 A | 4/1994 | Fairbanks et al. |
| 5,337,254 A | 8/1994 | Knee et al. |
| 5,339,445 A | 8/1994 | Gasztonyi |
| 5,350,988 A | 9/1994 | Le |
| 5,396,443 A | 3/1995 | Mese et al. |
| 5,410,278 A | 4/1995 | Itoh et al. |
| 5,422,806 A | 6/1995 | Chen et al. |
| 5,440,520 A | 8/1995 | Schutz et al. |
| 5,446,365 A | 8/1995 | Nomura et al. |
| 5,461,266 A | 10/1995 | Koreeda et al. |
| 5,502,838 A | 3/1996 | Kikinis |
| 5,511,203 A | 4/1996 | Wisor et al. |
| 5,513,152 A | 4/1996 | Cabaniss |
| 5,560,020 A | 9/1996 | Nakatani et al. |
| 5,561,692 A | 10/1996 | Maitland et al. |
| 5,568,103 A | 10/1996 | Nakashima et al. |
| 5,568,350 A | 10/1996 | Brown |
| 5,583,875 A | 12/1996 | Weiss |
| 5,586,308 A | 12/1996 | Hawkins et al. |
| 5,587,672 A | 12/1996 | Ranganathan et al. |
| 5,589,762 A | 12/1996 | Iannuzzo |
| 5,590,342 A | 12/1996 | Marisetty |
| 5,592,173 A | 1/1997 | Lau et al. |
| 5,594,360 A | 1/1997 | Wojciechowski |
| 5,630,110 A | 5/1997 | Mote, Jr. |
| 5,648,766 A | 7/1997 | Stengel et al. |
| 5,666,522 A | 9/1997 | Klein |
| 5,675,272 A | 10/1997 | Chu |
| 5,680,359 A | 10/1997 | Jeong |
| 5,682,093 A | 10/1997 | Kivela |
| 5,692,204 A | 11/1997 | Rawson et al. |
| 5,710,929 A | 1/1998 | Fung |
| 5,717,319 A | 2/1998 | Jokinen |
| 5,719,800 A | 2/1998 | Mittal et al. |
| 5,727,208 A | 3/1998 | Brown |
| 5,737,613 A | 4/1998 | Mensch, Jr. |
| 5,742,142 A | 4/1998 | Witt |
| 5,745,375 A | 4/1998 | Reinhardt et al. |
| 5,752,011 A | 5/1998 | Thomas et al. |
| 5,754,869 A | 5/1998 | Holzhammer et al. |
| 5,757,171 A | 5/1998 | Babcock |
| 5,757,172 A | 5/1998 | Hunsdorf et al. |
| 5,760,636 A | 6/1998 | Noble et al. |
| 5,764,110 A | 6/1998 | Ishibashi |
| 5,774,703 A | 6/1998 | Weiss et al. |
| 5,774,704 A | 6/1998 | Williams |
| 5,778,237 A | 7/1998 | Yamamoto et al. |
| 5,787,011 A | 7/1998 | Ko |
| 5,796,313 A | 8/1998 | Eitan |
| 5,812,860 A | 9/1998 | Horden et al. |
| 5,815,724 A | 9/1998 | Mates |
| 5,825,674 A | 10/1998 | Jackson |
| 5,825,972 A | 10/1998 | Brown |
| 5,847,552 A | 12/1998 | Brown |
| 5,848,281 A | 12/1998 | Smalley et al. |
| 5,864,225 A | 1/1999 | Bryson |
| 5,884,049 A | 3/1999 | Atkinson |
| 5,884,068 A | 3/1999 | Conary et al. |
| 5,894,577 A | 4/1999 | MacDonald et al. |
| 5,913,067 A | 6/1999 | Klein |
| 5,923,545 A | 7/1999 | Nguyen |
| 5,926,394 A | 7/1999 | Nguyen et al. |
| 5,933,649 A | 8/1999 | Lim et al. |
| 5,940,785 A | 8/1999 | Georgiou et al. |
| 5,940,786 A | 8/1999 | Steeby |
| 5,952,798 A | 9/1999 | Jones et al. |
| 5,974,557 A | 10/1999 | Thomas et al. |
| 5,977,763 A | 11/1999 | Loughmiller et al. |
| 5,978,926 A | 11/1999 | Ries et al. |
| 5,996,083 A | 11/1999 | Gupta et al. |
| 5,996,084 A | 11/1999 | Watts |
| 6,005,904 A | 12/1999 | Knapp et al. |
| 6,011,403 A | 1/2000 | Gillette |
| 6,023,776 A | 2/2000 | Ozaki |
| 6,025,737 A | 2/2000 | Patel et al. |
| 6,035,357 A | 3/2000 | Sakaki |
| 6,035,407 A | 3/2000 | Gebara et al. |
| 6,040,668 A | 3/2000 | Huynh et al. |
| 6,047,248 A | 4/2000 | Georgiou et al. |
| 6,065,126 A | 5/2000 | Tran et al. |
| 6,065,131 A | 5/2000 | Andrews et al. |
| 6,124,732 A | 9/2000 | Zilic et al. |
| 6,134,167 A | 10/2000 | Atkinson |
| 6,141,762 A | 10/2000 | Nicol et al. |
| 6,163,583 A | 12/2000 | Lin et al. |
| 6,167,524 A | 12/2000 | Goodnow et al. |
| 6,167,529 A | 12/2000 | Dalvi |
| 6,172,943 B1 | 1/2001 | Yuzuki |
| 6,216,234 B1 | 4/2001 | Sager et al. |
| 6,219,795 B1 | 4/2001 | Klein |
| 6,229,747 B1 | 5/2001 | Cho et al. |
| 6,242,936 B1 | 6/2001 | Ho et al. |
| 6,243,656 B1 | 6/2001 | Arai et al. |
| 6,255,974 B1 | 7/2001 | Morizio et al. |
| 6,304,824 B1 | 10/2001 | Bausch et al. |
| 6,310,912 B1 | 10/2001 | Maiocchi et al. |
| 6,311,287 B1 | 10/2001 | Dischler et al. |
| 6,360,327 B1 | 3/2002 | Hobson |
| 6,363,490 B1 | 3/2002 | Senyk |
| 6,366,157 B1 | 4/2002 | Abdesselem et al. |
| 6,369,557 B1 | 4/2002 | Agiman |
| 6,407,571 B1 | 6/2002 | Furuya et al. |
| 6,415,388 B1 | 7/2002 | Browning et al. |
| 6,422,746 B1 | 7/2002 | Weiss et al. |
| 6,425,086 B1 | 7/2002 | Clark et al. |
| 6,426,641 B1 | 7/2002 | Koch et al. |
| 6,448,815 B1 | 9/2002 | Talbot et al. |
| 6,456,049 B2 | 9/2002 | Tsuji |
| 6,457,134 B1 | 9/2002 | Lemke et al. |
| 6,470,289 B1 | 10/2002 | Peters et al. |
| 6,476,632 B1 | 11/2002 | La Rosa et al. |
| 6,484,041 B1 | 11/2002 | Aho et al. |
| 6,489,796 B2 | 12/2002 | Tomishima |
| 6,535,424 B2 | 3/2003 | Le et al. |
| 6,535,986 B1 | 3/2003 | Rosno et al. |
| 6,600,575 B1 | 7/2003 | Kohara |
| 6,621,242 B2 | 9/2003 | Huang et al. |
| 6,630,754 B1 | 10/2003 | Pippin |
| 6,650,074 B1 | 11/2003 | Vyssotski et al. |
| 6,650,740 B1 | 11/2003 | Adamczyk et al. |
| 6,657,504 B1 | 12/2003 | Deal et al. |
| 6,662,775 B2 | 12/2003 | Hauser |
| 6,668,346 B1 | 12/2003 | Schulz et al. |
| 6,674,587 B2 | 1/2004 | Chhabra et al. |
| 6,678,831 B1 | 1/2004 | Mustafa et al. |
| 6,690,219 B2 | 2/2004 | Chuang |
| 6,703,803 B2 | 3/2004 | Ohiwa et al. |
| 6,714,891 B2 | 3/2004 | Dendinger |
| 6,718,496 B1 | 4/2004 | Fukuhisa et al. |
| 6,721,892 B1 | 4/2004 | Osborn et al. |
| 6,737,860 B2 | 5/2004 | Hsu et al. |
| 6,748,408 B1 | 6/2004 | Bredin et al. |
| 6,774,587 B2 | 8/2004 | Makaran et al. |
| 6,792,379 B2 | 9/2004 | Ando |
| 6,794,836 B2 | 9/2004 | Strothmann et al. |
| 6,795,075 B1 | 9/2004 | Streitenberger et al. |
| 6,795,927 B1 | 9/2004 | Altmejd et al. |
| 6,799,134 B2 | 9/2004 | Borchers et al. |
| 6,801,004 B2 | 10/2004 | Frankel et al. |
| 6,804,131 B2 | 10/2004 | Galbiati et al. |
| 6,806,673 B2 | 10/2004 | Ho |
| 6,815,938 B2 | 11/2004 | Horimoto |

(56) References Cited

U.S. PATENT DOCUMENTS

| | | | |
|---|---|---|---|
| 6,815,971 B2 | 11/2004 | Wang et al. | |
| 6,831,448 B2 | 12/2004 | Ishii et al. | |
| 6,836,849 B2 | 12/2004 | Brock et al. | |
| 6,837,063 B1 | 1/2005 | Hood, III et al. | |
| 6,853,259 B2 | 2/2005 | Norman et al. | |
| 6,853,569 B2 | 2/2005 | Cheng et al. | |
| 6,885,233 B2 | 4/2005 | Huard et al. | |
| 6,889,331 B2 | 5/2005 | Soerensen et al. | |
| 6,889,332 B2 | 5/2005 | Helms et al. | |
| 6,914,492 B2 | 7/2005 | Hui et al. | |
| 6,938,176 B1 | 8/2005 | Alben et al. | |
| 6,947,865 B1 | 9/2005 | Mimberg et al. | |
| 6,970,798 B1 | 11/2005 | Cao et al. | |
| 6,975,087 B1 | 12/2005 | Crabill et al. | |
| 6,976,112 B2 | 12/2005 | Franke et al. | |
| 6,987,370 B2 | 1/2006 | Chheda et al. | |
| 6,990,594 B2 | 1/2006 | Kim | |
| 7,003,421 B1 | 2/2006 | Allen, III et al. | |
| 7,005,894 B2 | 2/2006 | Weder | |
| 7,042,296 B2 | 5/2006 | Hui et al. | |
| 7,043,649 B2 | 5/2006 | Terrell, II | |
| 7,045,993 B1 | 5/2006 | Tomiyoshi | |
| 7,051,215 B2 | 5/2006 | Zimmer et al. | |
| 7,068,557 B2 | 6/2006 | Norman et al. | |
| 7,071,640 B2 | 7/2006 | Kurosawa et al. | |
| 7,100,061 B2 | 8/2006 | Halepete et al. | |
| 7,112,978 B1 | 9/2006 | Koniaris et al. | |
| 7,119,522 B1 | 10/2006 | Tomiyoshi | |
| 7,122,978 B2 | 10/2006 | Nakanishi et al. | |
| 7,129,745 B2 | 10/2006 | Lewis et al. | |
| 7,149,909 B2 | 12/2006 | Cui et al. | |
| 7,180,322 B1 | 2/2007 | Koniaris et al. | |
| 7,256,571 B1 | 8/2007 | Mimberg et al. | |
| 7,256,788 B1 | 8/2007 | Luu et al. | |
| 7,334,198 B2 | 2/2008 | Ditzel et al. | |
| 7,336,090 B1 | 2/2008 | Koniaris et al. | |
| 7,336,092 B1 | 2/2008 | Koniaris et al. | |
| 7,348,827 B2 | 3/2008 | Rahim et al. | |
| 7,348,836 B1 | 3/2008 | Velmurugan | |
| 7,363,176 B2 | 4/2008 | Patel et al. | |
| 7,409,570 B2 | 8/2008 | Suzuoki | |
| 7,414,450 B2 | 8/2008 | Luo et al. | |
| 7,490,256 B2 * | 2/2009 | Marshall et al. | 713/321 |
| 7,509,504 B1 | 3/2009 | Koniaris et al. | |
| 7,574,613 B2 * | 8/2009 | Holle et al. | 713/300 |
| 7,725,749 B2 | 5/2010 | Mitarai | |
| 7,739,531 B1 | 6/2010 | Krishnan | |
| 7,849,332 B1 | 12/2010 | Alben et al. | |
| 7,882,369 B1 | 2/2011 | Kelleher et al. | |
| 7,886,164 B1 | 2/2011 | Alben et al. | |
| 8,762,761 B2 | 6/2014 | Zheng et al. | |
| 2001/0033504 A1 | 10/2001 | Galbiati et al. | |
| 2001/0045779 A1 | 11/2001 | Lee et al. | |
| 2002/0002689 A1 | 1/2002 | Yeh | |
| 2002/0004912 A1 | 1/2002 | Fung | |
| 2002/0026597 A1 | 2/2002 | Dai et al. | |
| 2002/0029352 A1 | 3/2002 | Borkar et al. | |
| 2002/0032829 A1 | 3/2002 | Dalrymple | |
| 2002/0049920 A1 | 4/2002 | Staiger | |
| 2002/0073348 A1 | 6/2002 | Tani | |
| 2002/0083356 A1 | 6/2002 | Dai | |
| 2002/0087896 A1 | 7/2002 | Cline et al. | |
| 2002/0099964 A1 | 7/2002 | Zdravkovic | |
| 2002/0113622 A1 | 8/2002 | Tang | |
| 2002/0116650 A1 | 8/2002 | Halepete et al. | |
| 2002/0138778 A1 | 9/2002 | Cole et al. | |
| 2002/0178390 A1 | 11/2002 | Lee | |
| 2002/0194509 A1 | 12/2002 | Plante et al. | |
| 2003/0036876 A1 | 2/2003 | Fuller, III et al. | |
| 2003/0065960 A1 | 4/2003 | Rusu et al. | |
| 2003/0074591 A1 | 4/2003 | McClendon et al. | |
| 2003/0079151 A1 | 4/2003 | Bohrer et al. | |
| 2003/0110423 A1 | 6/2003 | Helms et al. | |
| 2003/0133621 A1 | 7/2003 | Fujii et al. | |
| 2003/0189465 A1 | 10/2003 | Abadeer et al. | |
| 2004/0025061 A1 | 2/2004 | Lawrence | |
| 2004/0032414 A1 | 2/2004 | Jain et al. | |
| 2004/0073821 A1 | 4/2004 | Naveh et al. | |
| 2004/0105237 A1 | 6/2004 | Hoover et al. | |
| 2004/0105327 A1 | 6/2004 | Tanno | |
| 2004/0123170 A1 | 6/2004 | Tschanz et al. | |
| 2004/0123172 A1 | 6/2004 | Sheller | |
| 2004/0128631 A1 | 7/2004 | Ditzel et al. | |
| 2004/0215779 A1 | 10/2004 | Weber | |
| 2005/0007047 A1 | 1/2005 | Strothmann et al. | |
| 2005/0071705 A1 | 3/2005 | Bruno et al. | |
| 2005/0218871 A1 | 10/2005 | Kang et al. | |
| 2005/0268141 A1 | 12/2005 | Alben et al. | |
| 2005/0268189 A1 | 12/2005 | Soltis | |
| 2005/0289367 A1 | 12/2005 | Clark et al. | |
| 2006/0074576 A1 | 4/2006 | Patel et al. | |
| 2007/0220289 A1 * | 9/2007 | Holle et al. | 713/300 |
| 2007/0229054 A1 | 10/2007 | Dobberpuhl et al. | |
| 2007/0234088 A1 * | 10/2007 | Marshall et al. | 713/320 |
| 2007/0257710 A1 | 11/2007 | Mari et al. | |
| 2007/0296440 A1 | 12/2007 | Takamiya et al. | |
| 2008/0143372 A1 | 6/2008 | Koniaris et al. | |
| 2009/0072885 A1 | 3/2009 | Kawasaki | |
| 2010/0216524 A1 | 8/2010 | Thomas et al. | |
| 2010/0318828 A1 * | 12/2010 | Elting et al. | 713/340 |
| 2011/0264946 A1 | 10/2011 | Goodemote et al. | |
| 2011/0283130 A1 | 11/2011 | Pai et al. | |
| 2012/0102344 A1 | 4/2012 | Kocev et al. | |

FOREIGN PATENT DOCUMENTS

| | | |
|---|---|---|
| EP | 0501655 | 9/1992 |
| EP | 0632360 | 1/1995 |
| EP | 0978781 | 2/2000 |
| EP | 1096360 | 5/2001 |
| EP | 1182538 | 2/2002 |
| EP | 1182556 | 2/2002 |
| EP | 1398639 | 3/2004 |
| GB | 2342471 | 4/2000 |
| GB | 2393540 | 3/2004 |
| GB | 2404792 | 2/2005 |
| JP | H07129277 | 5/1995 |
| JP | 409185589 | 7/1997 |
| JP | 10187300 | 7/1998 |
| JP | 2000284862 | 10/2000 |
| JP | 3076234 | 3/2001 |
| JP | 2003122459 | 4/2003 |
| JP | 2003195981 | 7/2003 |
| WO | 0127728 | 4/2001 |
| WO | 03079171 | 9/2003 |

OTHER PUBLICATIONS

"High Speed, Digitally Adjusted Stepdown Controllers for Notebook CPUS", Maxim Manual, pp. 11 & 21.

Alben, et al.; A Processor Speed Adjustment System and Method; U.S. Appl. No. 10/449,942, filed May 30, 2003.

Alben, et al.; A Processor Voltage Adjustment System and Method; U.S. Appl. No. 10/448,891, filed May 30, 2003.

Baker, K. et al.; "Wafer Burn-In Isolation Circuit" IBM Technical Disclosure Bulletin, IBM Corp., New York, US, vol. 32, No. 6B, Nov. 1, 1989, pp. 442-443, XP00073858 ISSN: 0018-8689.

Baker, K. et al.; 'Shmoo Plotting: The Black Art of IC Testing, IEEE Design and Test of Computers, IEEE vol. 14, No. 3; Jul. 1, 1997; pp. 90-97; XP000793305 ISSNL 0740-7475.

Calavert, J.B., "The Phase-Locked Loop", Jul. 24, 2001, http://www.du.edu/~etuttle/electron/elect12.htm.

Grishman, Ralph; Lecture Notes, "Computer System Design-Spring 2002", "Lecture 2: Combinational Logic Design", 2002, Department of Computer Science, New York University.

Operation U (Refer to Functional Diagram), LTC 1736 Linear Technology Manual, p. 9.

Kelleher, et al.; A Processor Performance Adjustment System and Method; U.S. Appl. No. 10/295,619, filed Nov. 14, 2002.

Laplante, P. Comprehensive Dictionary of Electrical Engineering, CRC Press, IEEE Press, pp. 164-165.

Microsoft Technology Inc. Linear Voltage Fan Speed Control Using Microchips TC64X Family, pp. 1-4, 2003.

(56) References Cited

OTHER PUBLICATIONS

Migdal, et al.; "A Processor Temperature and ODE Adjustment System and Method", U.S. Appl. No. 10/295,748, filed Nov. 14, 2002.
Oner, H et al.; "A Compact Monitoring Circuit for Real-Time-On-Chip Diagnosis of Hot-Carrier Induced Degradation". Microelectronics Test Structures, 1997. ICMTS 1997. Proceedings, IEEE International Conference on Monterey, CA May 17 1993-May 20, 1997, pp. 72-76.
Govil, K. et al.; "Comparing Algorithms for Dynamic Speed-Setting of a Low-Power PCU"; International Computer Science Institute; Berkeley, CA; Apr. 1995.
Mobile Pentium® III Processors-Thermal Management, http://support.intel.com/support/processors/mobile/pentiumiii/thermal.htm, Sep. 12, 2002, pp. 1-4.
Hong, I. et al.; Power Optimization of Variable Voltag Core Based Systems; Jun. 1998; Design Automation Conference Proceedings.
Hong, I. et al.; Synthesis Techniques for Low-Power Hard Real-Time Systems on Variable Voltage Processors; Real-Time System Symposium Proceedings. Dec. 1998.
Intel, Intel Pentium 4 Processor in the 423-pin Package, pp. 78-80, (Date believed prior to Nov. 14, 2002).
Mobile Pentium® III Processors-Thermal Diode, http://support.intel.com/support/processors/mobile/pentiumiii/diode.htm, Sep. 12, 2002, pp. 1-2.
Mobile Pentium® III Processors-Enhanced Intel® SpeedStep™ Technology, http://support.intel.com/support/processors/mobile/pentiumiii/tti004.htm, Sep. 12, 2002, pp. 1-4.

\* cited by examiner

300

| 310 |
| --- |
| An activity monitoring process is performed. |

| 320 |
| --- |
| A system characteristic analysis process is performed. |

| 330 |
| --- |
| A system utilization analysis process is performed. |

| 340 |
| --- |
| A threshold value is established. |

FIG 3

POWER CONSUMPTION REDUCTION SYSTEMS AND METHODS

FIELD

Embodiments according to the present invention generally relate to power consumption management in electronic devices.

BACKGROUND

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities often involve processing devices consuming power. However, many modern mobile processing devices have limited power supplies, and utilization of ever increasingly sophisticated and complex applications is putting even greater demands on the limited power supplies.

Most conventional approaches to power management involve putting a device in a low or reduced power state. However, entering and exiting a low state typically consumes power, and since most processing activities can not be performed during low power states, power expended inappropriately entering and exiting a low power state is essentially wasted. In addition, the lag in application processing while a system enters and exists a low power state can impact responsiveness to application activities.

Conventional power conservation typically includes monitoring activity and transitioning the logic to the low power state (e.g., power gating) after detecting that the logic has been inactive for a period of time. However, traditional power management approaches usually involve a fixed pre-determined trigger for entering a power reduction state, and the fixed pre-determined triggers are typically set during product design and not adjustable. Typical modern portable devices attempt to apply relatively unsophisticated power saving techniques while running very diverse complex applications with widely varying operating characteristics, resulting in a higher probability of wasted power and reduced responsiveness during inappropriate low power state initiation.

SUMMARY

Power management systems and methods that facilitate efficient and effective power conservation are presented. In one embodiment a power management method comprises: performing an initiation metric determination process, and adjusting operations of a logic component based on said threshold value. In one exemplary implementation, the initiation metric determination process includes monitoring activity of a logic component, and establishing a power conservation initiation threshold value. The initiation metric determination process can include performing a system architecture characteristic analysis in which a system architecture power-consumption break-even time (BE) is determined for the system. The initiation metric determination process can also include performing a system utilization analysis process in which idle period durations detected during said monitoring are sorted into a variety of different length intervals and analyzed accordingly. Histograms of idle period durations can be collected. Adjusting operations can include entering a low power state.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements. The drawings are not necessarily to scale.

FIG. 3 is a flowchart of an exemplary power state metric or threshold determination process in accordance with one embodiment of the present invention.

DETAILED DESCRIPTION

Figure 1:
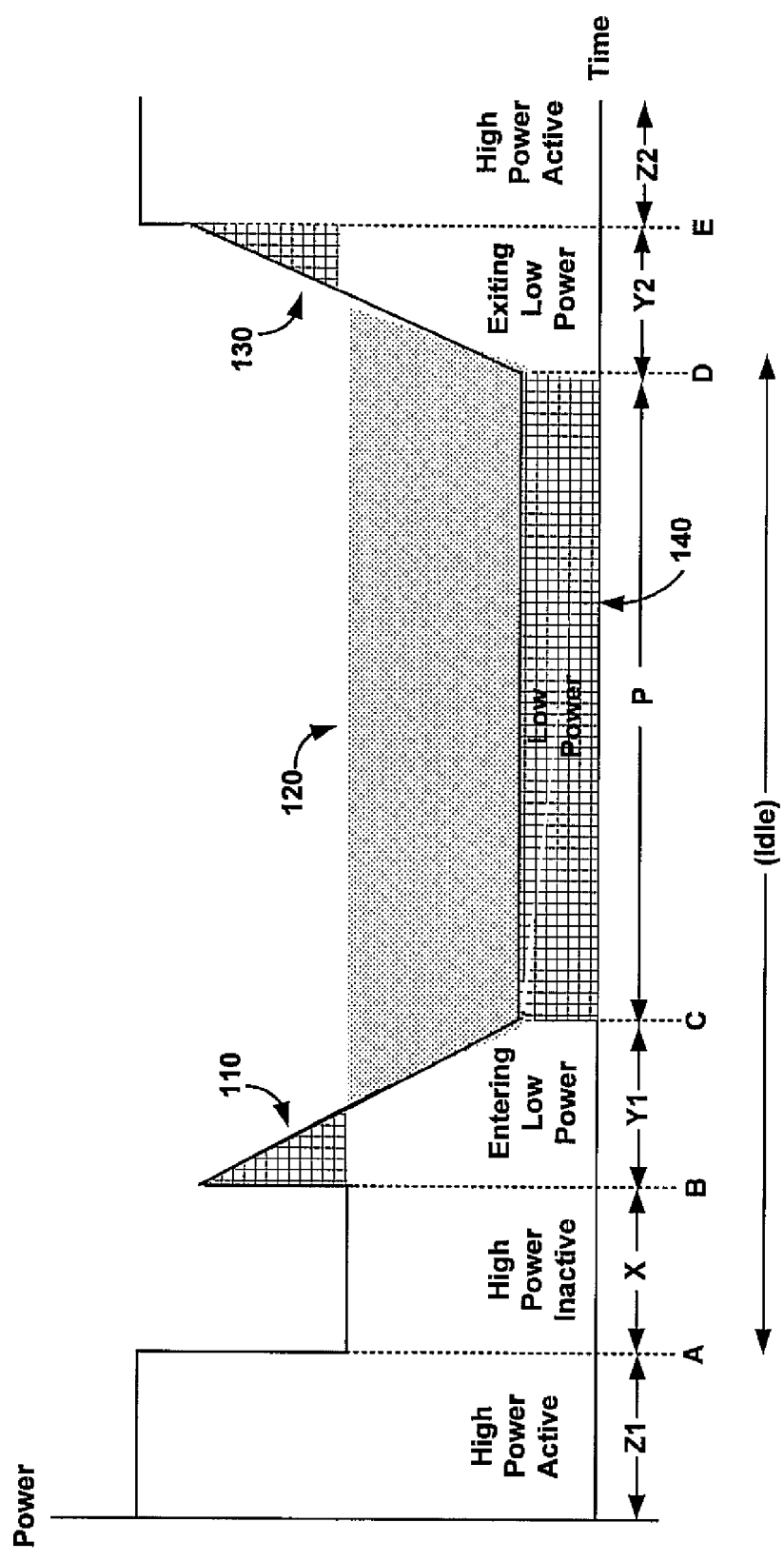
FIG. 1 is a graph of exemplary power state transitions in accordance with one embodiment of the present invention.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding," "decoding," "deblocking," "receiving," "sending," "using," "applying," "calculating," "incrementing," "comparing," "selecting," "summing," "weighting," "computing," "accessing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Present systems and methods facilitate efficient and effective conservation of power resources. In one embodiment, parameters of when to enter a reduced power state are automatically adjusted. In one exemplary implementation, automatic adjustments are made based upon automated intelligent analysis of recent processing activities (e.g., post production, in the field, etc.). For example, an "idle detect" threshold time value can be automatically adjusted based upon flexible and intelligent analysis of processing activities associated with currently running applications.

A present system can enter various power states. In one exemplary embodiment, a system has a high power state and a low power state. In one exemplary implementation, during a high power state a relatively large number of the possible sub-components in a system are enabled and during a low power state a much smaller number of possible sub-components are enabled. It is appreciated that there can also be intermediate power states.

FIG. 1 is a graph of exemplary power state transitions in accordance with one embodiment of the present invention. The vertical axis represents power consumption and the horizontal axis represents time. The graph shows a system after initial power up and active application processing. The system is in a high power state with active application processing occurring during time frame Z1. Then at time A the active application processing stops and the system is in a high power state with inactive application processing during time frame X. At time B the system begins to "turn components off" during period Y1 to enter a low power state. Initially at time B more power is consumed in entering a low power state but shortly reaches a low power state. At time C "turning off" selected components is complete and the system enters a low power state during period P. At time D the system receives an indication that active application processing is attempting to begin again and the system begins to exit the low power state and turns on the selected components during period Y2. At time E the system enters another high power state with active application processing during period Z2.

FIG. 1 is explained in terms of a low power state in which active application processing is "stopped". It is appreciated that some processing can continue in the system. In one embodiment, a reduced amount of application processing can continue during the low power state.

In one embodiment, the system consumes some power when entering the low power state (e.g., during period Y1), during the low power state (e.g., during period P) and during the exit of the low power state (e.g., during period Y2). It is also appreciated that once the system begins to enter the low power state at time B that the system is not able to perform full application processing until the system completes exiting the low power system at time E. Thus, it is desirable for the power saved by entering the low power state to be greater than the additional or extra power consumed during periods Y1 and Y2. With reference to FIG. 1, it is desirable to have the energy saved (e.g., represented by area 120) associated with entering the low power state be greater than energy expended (e.g., represented by areas 110 and 130). Inappropriate utilization of the low power states (e.g., expending more power entering and exiting the low power state than is saved being in the low power state, etc.) can waste power. The present systems and method facilitate adaptive efficient utilization of reduced or low power states.

Figure 2:
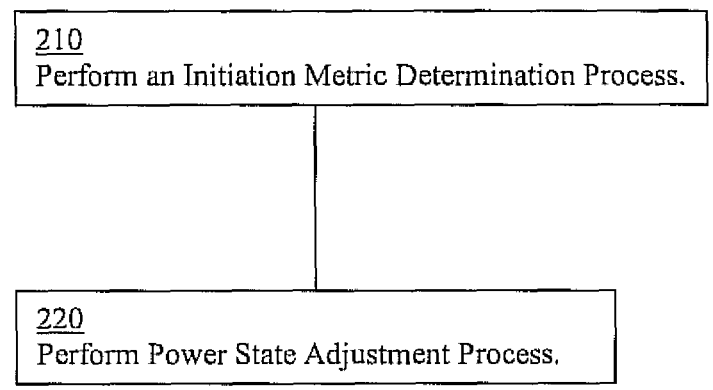
FIG. 2 is flow chart of exemplary power management method in accordance with one embodiment of the present invention.

FIG. 2 is a flow chart of exemplary power management method 200 in accordance with one embodiment of the present invention. Power management method 200 facilitates efficient and effective power management. Power management method 200 can facilitate on the fly power management with updated parameters.

In block 210, an automated initiation metric determination process is performed. In one embodiment, an automated initiation metric determination process determines a metric or threshold for initiating or triggering a power state adjustment process. An automated initiation metric determination process can facilitate adjustments in a power saving initiating or triggering threshold value or indication. The threshold adjustments can be based upon relatively recent activities or temporally proximate behavior or characteristics. The threshold adjustments can also be automatically determined and updated in the field.

In one embodiment, the initiation metric or threshold for initiation or triggering a power state adjustment process corresponds to the duration of a high power inactive period (e.g., duration X in FIG. 1, etc.). For example, the threshold can be a time duration (e.g., 2 seconds, 100 milliseconds, 3 minutes, etc.) that the system waits after an idle period starts (e.g., at time A of FIG. 1, etc.) before initiating or entering a low power state transition (e.g., at time B of FIG. 1, etc.). Additional exemplary aspects of initiation metric determination processes are set forth in description below.

In block 220, a power state adjustment process is performed. The power state adjustment process is performed in accordance with results of the automated initiation metric or threshold determination process. In one embodiment, a reduced power consumption state or mode is entered and exited. For example, the power state adjustment process can begin at time B of FIG. 1 when the system enters a low power state. In one exemplary implementation, the power state (e.g., high power state, low power state, etc.) is controlled by power-gating.

FIG. 3 is a flowchart of an exemplary automated initiation metric determination or threshold determination process 300 in accordance with one embodiment of the present invention.

A an automated initiation metric or threshold determination process can include a number of factors or considerations. The factors or considerations can include examining the probability that initiating a power reduction operation will save more power than the power cost of entering and exiting a power reduced state. The an automated initiation metric or threshold determination process can automatically update the threshold value. In addition, the threshold determination process can be directed to establishing an optimized threshold setting that also facilitate minimizing detrimental response effects, such as lag after wake-up indications.

In block 310, an activity monitoring process is performed. It is appreciated that durations of component active operations and inactive operations can be tracked. The monitored or tracked active operations and inactive operations can be directed to tasks or activities other than changing power levels. For example, operations associated with an application (e.g. receiving input, calculating results, presenting output, activities that occur during period Z1 of FIG. 1, etc.) are monitored for purposes of determining application activity, and operations directly associated with entering and exiting the low power state (e.g. power gating, activities during period Y1 of FIG. 1, etc.) are not monitored for purposes of determining application activity. In other words, if an application is inactive and the system begins to enter a low power state, the operations directly associated with entering the low power state are not monitored for purposes of initiating an exit of the low power state.

In block 320, a system architecture characteristic analysis process is performed. In one embodiment, the system architecture power-consumption break-even time (BE) is determined for the system. In one exemplary implementation, the power-consumption break-even time is the amount of time the system has to stay in the low power state to save an amount of power equal to the amount or power overhead consumed entering and leaving the power state.

In step 330, a system utilization analysis process is performed. In one embodiment, the idle period durations measured in step 310 can be sorted into a variety of different length intervals and analyzed accordingly. In one embodiment, histograms are created based upon sorted idle time durations. The idle period durations can be sorted into "bins" or "buckets" associated with an idle time duration.

In one embodiment, the idle periods within particular durations are tracked or counted. The "bin" or "bucket" count is increased for each corresponding idle period. For example, idle periods that are less than $2^X$ clock cycles are counted and stored in a bucket 0; idle periods that are between $2^X$ and $2^{(X+1)}$ clock cycles are counted and stored in a bucket 1; ... up to idle periods that are greater than $2^{(X+14)}$ clock cycles that are stored in a bucket 16. The variable X is a programmable number that is based on clock frequency changes for different operating modes (e.g., X can be adjusted to cover a desired range of idle periods as the clock frequency is changed for different operating modes). In the current embodiment, sixteen buckets are used. Bucket 0 stores the number of idle periods that are less than $2^X$ clock cycles. Bucket 1 stores the number of idle periods that are between than $2^X$ and $2^{(X+1)}$ clock cycles. Up to, bucket 16 that stores the number of idle periods that are greater than $2^{(X+14)}$ clock cycles. In alternate embodiments, different numbers of buckets may be used. For example, increasing the number of buckets can improve resolution in critical ranges.

It is appreciated the present systems and methods can be utilized in weighted average type analysis. In one exemplary implementation an algorithm in which the total power saved during the time periods beyond the threshold can be analyzed.

In one embodiment, for each bucket greater than or equal to the threshold the following algorithm is performed;

(idle period of the bucket−threshold−BE)*(bucket count).

In one embodiment, If the sum from the buckets greater than the threshold is positive there is a the net power savings and if the sum negative there is not a net power savings.

Figure 4A:
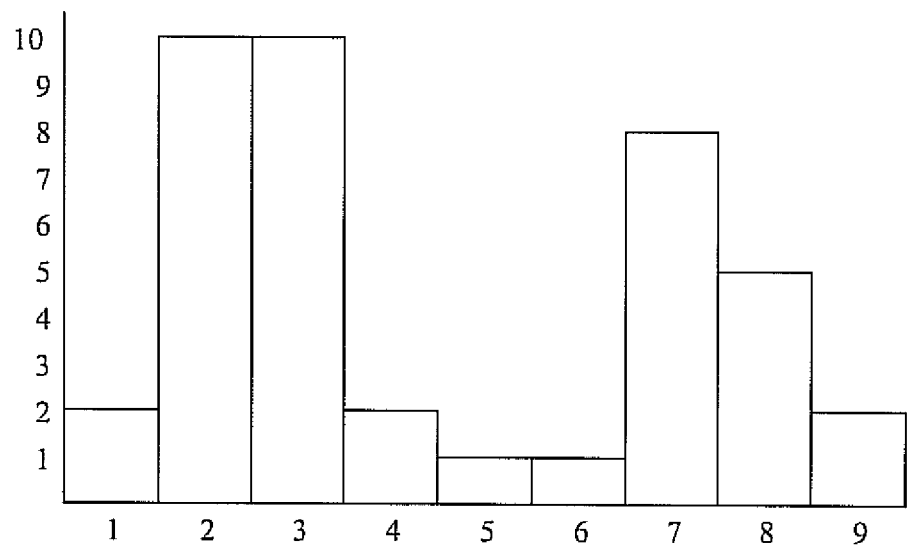
FIG. 4A is a block diagram of a histogram in accordance with one embodiment of the present invention.

FIG. 4A is a block diagram of a histogram of idle times or durations in accordance with one embodiment of the present invention. The X axis corresponds to the number of seconds in an idle period and the Y axis corresponds to a count of the number of times the system entered a corresponding idle period. In one exemplary implementation, the breakeven time is 3 seconds. If the threshold value is set at 2 seconds the following analysis:

$$((2-2-3)*10)+((3-2-3)*10)+((4-2-3)*2)+((5-2-3)*1)+((6-2-3)*1)+((7-2-3)*8)+((8-2-3)*5)+((9-2-3)*2)=-12$$

which indicates that there would be a net power loss. A similar analysis indicates there is a net power loss if the threshold is set at 3 seconds. However, if the threshold is set at 4 seconds the following analysis:

$$((4-4-3)*2)+((5-4-3)*1)+((6-4-3)*1)+((7-4-3)*8)+((8-4-3)*5)+((9-4-3)*2)=6$$

which indicates that there would be a net power savings.

The histogram of FIG. 4A indicates that if the threshold or wait period (e.g., period X of FIG. 1) is set to 4 seconds the probability of saving energy overall when entering the low power state after inactivity for 4 seconds or more is relatively high and beneficial. Therefore, while there may be a few instances (e.g., 4, 5, and 6 second bins of the histogram) where the system may not remain inactive long enough to break even on power consumption, these instances are significantly outweighed by the instances (e.g., 7, 8 and 9 second bins of the histogram) where the system remains inactive long enough to more than break even on power consumption. Thus, the 4 second threshold can provide a significant overall power savings. It is appreciated that the durations can be measured in a variety of units (e.g., microseconds (μs), milliseconds (ms), etc.).)

Figure 4B:
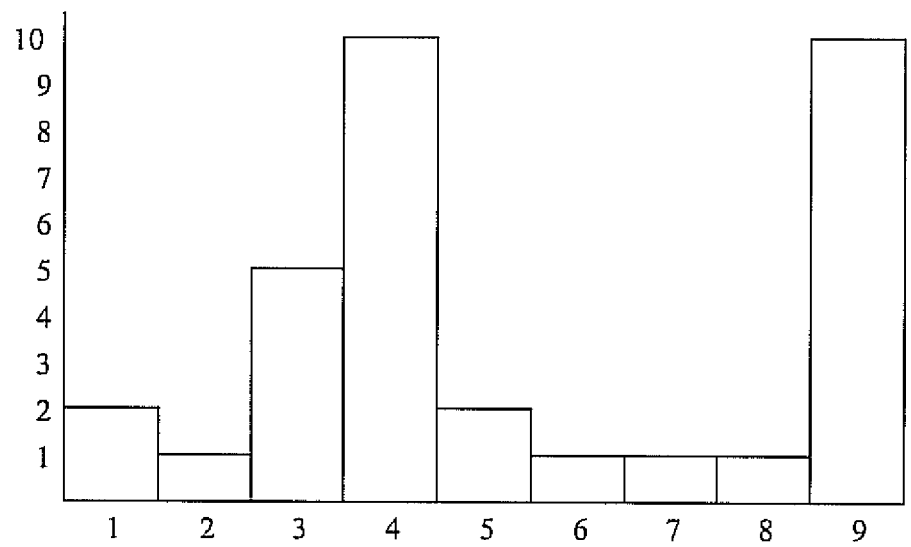
FIG. 4B is another block diagram of a histogram in accordance with one embodiment of the present invention.

FIG. 4B is another block diagram of a histogram in accordance with one embodiment of the present invention. FIG. 4B can represent an entirely different system from FIG. 4A, or FIG. 4B can represent the same system as FIG. 4A monitored at a different time. In one exemplary implementation, the breakeven time is 3 seconds. The histogram of FIG. 4B indicates that if the threshold or wait period (e.g., period X of FIG. 1) is set to 2 seconds there is a likelihood of an overall net energy savings. For example, if the threshold value is set at 2 seconds the following analysis:

$$((2-2-3)*1)+((3-2-3)*5)+((4-2-3)*10)+((5-2-3)*2)+((6-2-3)*1)+((7-2-3)*1)+((8-2-3)*1)+((9-2-3)*10)=-23$$

which indicates that there would be a net power savings.

In another embodiment, a different algorithm can be utilized. If the threshold or wait period (e.g., period X of FIG. 1) is set to 5 seconds the number of times the system stays in low power for more than three seconds indicates the probability remaining in an idle state for longer than 3 seconds (e.g., saving power for 3 or more seconds) when entering the low power state after inactivity for more than 5 seconds is beneficial. There are a relatively few instances (e.g., 5 times total for the 5, 6, 7 and 8 second bins of the histogram) where the system does not remain inactive long enough to break even on power consumption, but these are outnumbered by instances (e.g., 10 times total for the 9 second bin of the histogram) where the system may does remain inactive long enough to at least break even on power consumption. Thus, the 5 second threshold is likely to provide an overall power savings and probably beneficial.

While "guessing wrong" or inappropriately entering a power reduction state for a system that has a wakeup process that requires a relatively short time may have relatively little impact to the overall performance, when the wakeup process requires a relatively long time the impact of guessing wrong can increase. It can be important to avoid entering the low power state when the logic is not likely to remain in the low power state for a sufficiently long enough time to permit power savings commensurate with power consumption during a long wake up process.

Figure 4C:
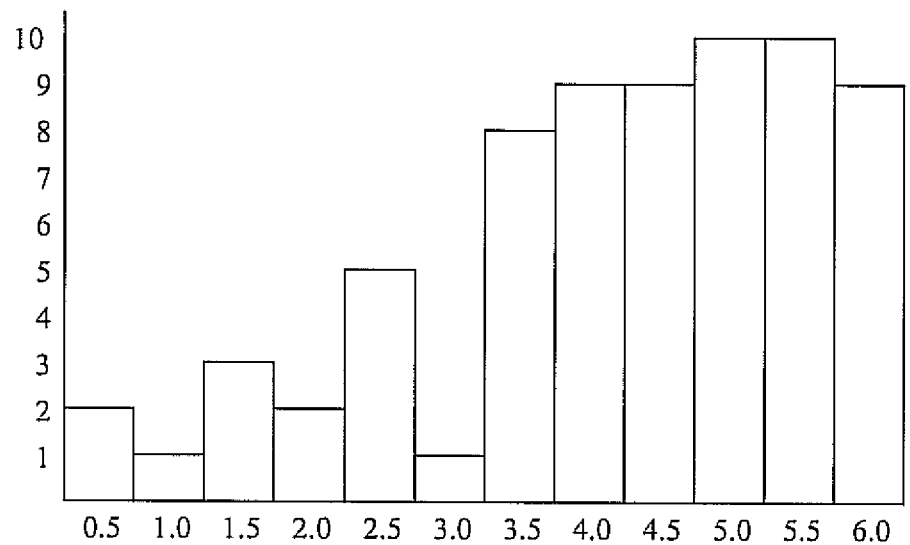
FIG. 4C is a block diagram of another exemplary histogram with a different number of buckets in accordance with one embodiment of the present invention.
Figure 4D:
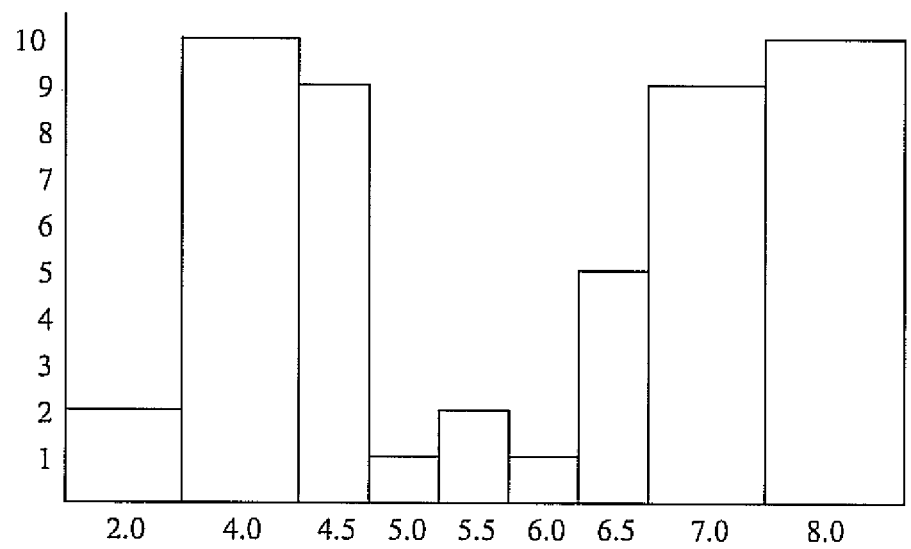
FIG. 4D is a block diagram of another exemplary histogram with different duration buckets in accordance with one embodiment of the present invention.

It is appreciated that adjustments to the buckets can be utilized to tweak appropriate threshold prediction. In alternate embodiments, different numbers of buckets may be used. For example, increasing the number of buckets can improve resolution in critical ranges. FIG. 4C is a block diagram of another exemplary histogram with a different number of buckets in accordance with one embodiment of the present invention. The resolution or duration of 12 buckets in FIG. 4C is a half a second as compared to the resolution or duration of one second for the 9 buckets in FIG. 4A. In one exemplary implementation, the total number of buckets remains the same but the time duration associated with the buckets can be adjusted. For example, some buckets can be associated with a two second duration and other buckets can be associated with half a second duration. FIG. 4D is a block diagram of another exemplary histogram with different duration buckets in accordance with one embodiment of the present invention. There are a total of nine buckets similar to FIG. 4A except in FIG. 4D the duration of the buckets between 4.5 to 6.5 are incremented by half a second while the others are incremented by 2 second durations.

With reference again to FIG. 3, in step 340 a threshold value is established. The threshold is set based on the previous activity patterns stored in the binning. The threshold is calculated to maximize power efficiency, while maintaining performance. In one exemplary implementation, the threshold value is established by a threshold determining component (e.g., threshold determining component 608, etc.). In one embodiment, the threshold is forwarded. For example, the threshold is communicated to a power control component. In one embodiment, a power control component (e.g., power control component 604, etc.) sets a power level based on the threshold.

FIGS. 2 and 3 are exemplary flowcharts and although specific steps are disclosed in the flowcharts, such steps are exemplary. That is, embodiments of the present invention are well-suited to performing various other steps or variations of the steps. The flowcharts of FIGS. 2 and 3 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Figure 5:
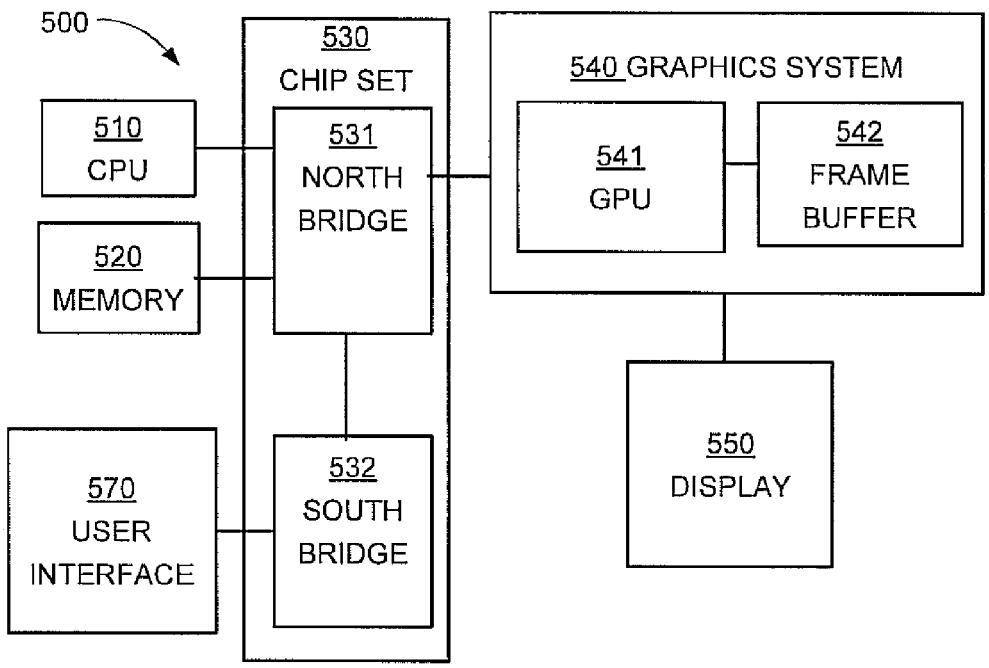
FIG. 5 is a block diagram of an example of a computer system upon which an intelligent power saving process can be implemented in accordance with the one embodiment of the present invention.

FIG. 5 is a block diagram of an exemplary computer system 500, one embodiment of a computer system upon which embodiments of the present invention can be implemented. Computer system 500 includes central processor unit 510, main memory 520 (e.g., random access memory), chip set 530 with north bridge 531 and south bridge 532, user interface 570, and graphics subsystem 540 which is coupled to display 550. Computer system 500 includes several busses (e.g., the Advanced Graphics Port interface, a PCI bus, etc.) for communicatively coupling the components of computer system 500. It is appreciated that other components (bulk storage component, removable storage component, communications port, etc.) can be included in computer system 500.

The components of computer system 500 cooperatively operate to provide versatile functionality and performance, including implementing power conservation (e.g., during low power states or modes, etc.). Communications bus communicates information, central processor 510 processes information, main memory 520 stores information and instructions, and user interface 570 (e.g., a keyboard, a mouse, etc,) provides a mechanism for inputting information and/or for pointing to or highlighting information on display 550. Graphics processor 541 processes graphics commands from central processor 510 and provides the resulting data to frame buffer 542 for storage and retrieval by display monitor 550.

Generally speaking, the computer system 500 includes the basic components of a computer system platform that implements functionality in accordance with embodiments of the present invention. The computer system 500 can be implemented as, for example, any of a number of different types of computer systems (e.g., servers, laptops, desktops and notebooks), as well as a home entertainment system (e.g., a DVD player) such as a set-top box or digital television, or a portable or handheld electronic device (e.g., a portable phone, personal digital assistant, or handheld gaming device).

Figure 6:
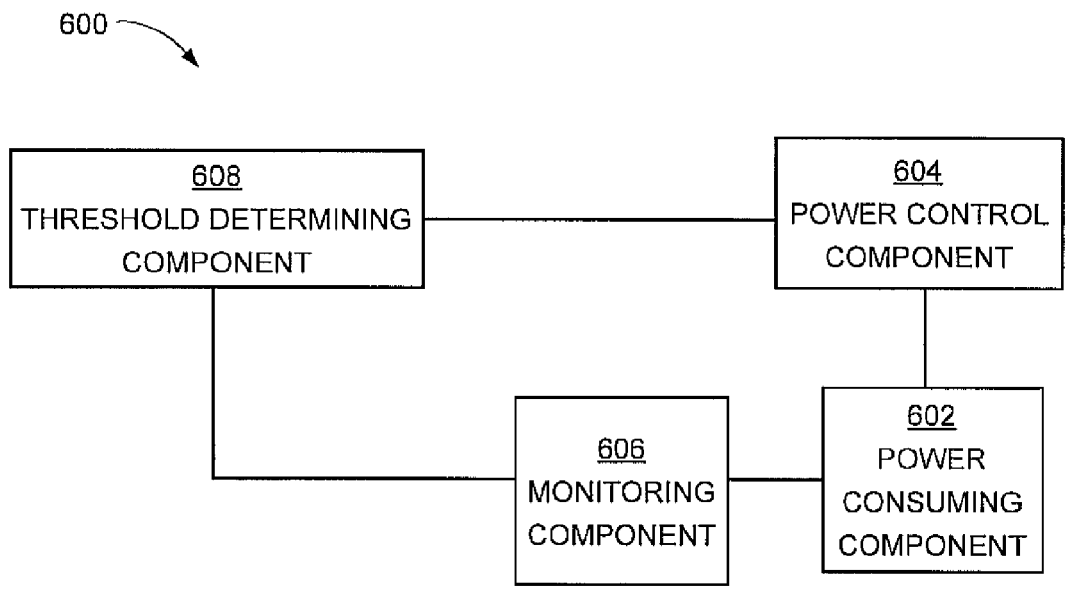
FIG. 6 is a block diagram showing the elements of an exemplary power management system in accordance with one embodiment of the present invention.

FIG. 6 is a block diagram showing the elements of a power management system 600 according to one embodiment of the present invention. In the example of FIG. 6, the system 600 includes a power-consuming element 602, such as a logic circuit. The power-consuming element 602 is communicatively coupled to a power control component 604 and a monitoring component 606. The power control component 604 and the monitoring component 606 are communicatively coupled to a threshold-determining component 608.

In one embodiment, the monitoring component 606 monitors the activity pattern of the power-consuming element 602 in real time and forwards the results to threshold determining component 608 and power control component 604. Based on the activity of the power-consuming element 602, the threshold determining component 608 determines a beneficial threshold or duration of inactivity for indicating power reduction initiation (e.g., initiate transition to a low power state, begin power-gating, etc.). Power control component 604 directs power consumption state adjustment based upon the threshold received from the threshold determining component 608. In one embodiment, power control component 604 regulates power consumption by directing power-gating As part of analyzing the monitored activity pattern of the power-consuming element 602, the threshold determining component 608 can direct allocation or binning (e.g., to create a histogram, etc.) of the duration of previous idle periods. In one embodiment, sixteen buckets or bins can be used. Bucket 0 stores the number of idle periods that are less than $2^X$ clock cycles. Bucket 1 stores the number of idle periods that are between than $2^X$ and $2^{(X+1)}$ clock cycles. Up to, bucket 16 that stores the number of idle periods that are greater than $2^{(X+14)}$ clock cycles. X is programmable and can be adjusted to cover a desired range of idle periods as the clock frequency is changed for different operating modes. In alternate embodiments, different numbers of buckets and bucket durations may be used (e.g., see FIGS. 4A through 4D). For example, increasing the number of buckets can improve resolution in critical ranges (e.g., ranges close to a breakeven threshold value, other ranges, etc.).

The monitoring component 606 can sample continued activity at various times and process the results to form an updated histogram. In the one embodiment, the histogram is sampled once very second. However, alternate embodiments may sample the histogram at any interval. An optimal interval to use can depend on the minimum monitoring time necessary to get a useful history of the activity pattern. However, if the sampling interval is set too long, then the power management system 600 might be too slow to adapt to changing activity patterns.

In one embodiment, power gating is utilized. Power-gating is a technique by which the power or ground connection of a logic circuit is electrically disconnected using on-chip field-effect transistors ("FETs") in order to save static power when the circuit is not being used. It can reduce power consumption in nanometer-scale process technologies with high sub-threshold leakage. A successful power reduction or power-gating cycle of a graphics engine can be modeled as follows:

1. The power-consuming element 602 (e.g., a graphics engine, CPU component, etc.) becomes idle.
2. The monitoring component 606 (e.g., idle-detection hardware, etc.) waits for [X] idle clock cycles, rejecting idle periods that are too short to be efficiently power-gated.
3. The control component 604 power-gates the graphics engine, taking [Y1] seconds.
4. The power-consuming element 602 is power-gated.
5. The power-consuming element 602 must be powered-on to perform new work.
6. The control component 604 powers-on the power-consuming element 202, taking [Y2] seconds.
7. The power-consuming element 602 is now active again.

The above model time line can be summarized as follows:
1. Idle starts; delay for [X]
2. Power-gating takes [Y1]
3. Remain power-gated for [P]
4. Wakeup starts; powering-on takes [Y2]
5. Work starts again Thus, the total idle time [I]=[X]+[Y1]+[P], or the time between going idle and waking-up. Therefore, power-gated time [P]=[I]−[X]−[Y1].

There can be power consumption overhead to go in and out of power-gating. In one embodiment, the threshold determining component 608 can consider the break-even time [BE], such that the effective power-gated time [P']=[I]−[X]−[Y1]−[BE]. The break-even time can be a very important factor, because if [I] is too small, the effective power-gated time can be negative with the potential for more power to be wasted than saved.

There is also a potential performance impact due to power-gating. The impact can be characterized as the delay between the start of the wakeup process and the resumption of work (e.g., duration Y2 for each power-gating cycle, etc.).

In one embodiment [Y1], [BE], and [Y2] can be characterized per system design, and the changing variables are the total idle periods [I] and the idle filter setting [X]. Given a sample of the idle period durations with the above mentioned hardware, the total effective power-gated time [P'] can be calculated for each idle filter setting [X]. Then the optimal idle filter setting that yields the highest total effective power-gated time can be analytically determined in real time.

In one embodiment, a negative performance impact from power-gating can also be controlled by limiting the number of power-gating cycles over an interval to a programmable maximum of [N]. In one exemplary implementation, this can ensure that the total latency impact over the interval would be limited to a maximum of [N]*[Y2].

In one embodiment, power management system 600 monitors past activity to determine configuration settings for future events. In this situation, the performance of the power management system 600 can be dependent on how well future activity corresponds to previous activity. Therefore, it can be useful to evaluate how well the power management system 600 is performing on a relatively often or frequent basis. The power management system 600 can suspend or turn off power reduction activities when they would perform poorly or be detrimental.

In one embodiment, the performance of the power management system 600 results are measured. In one exemplary implementation, the results for different histograms created during different sampling intervals can be compared. The results of a first histogram collected over a first time frame of [T0] to [T1] and the results of a second histogram collected over a second time frame from [T1] to [T2]. For example, the first histogram can be similar to the histogram of FIG. 4A and the second histogram can be similar to the histogram of FIG. 4B. A first optimal idle filter setting [X0] can be established based on the histogram collected from [T0] to [T1]. A second optimal idle filter setting [X1] can be established based on the histogram collected from [T1] to [T2]. The activity pattern between [T1] and [T2] can compared with the [X0] idle filter setting. If [X0] provides acceptable power efficiency relative to the system-specific break-even point, in one exemplary implementation the power management system 600 is considered to be performing well and can continue to be enabled.

In one embodiment, it is possible to enable power-gating when the previous prediction has been proven to be successful. This ensures that the power management system can be applied on stable activity patterns, where successful application is most likely.

In one exemplary implementation, entrance of low power states is suspended when the monitoring indicates an activity pattern is changing rapidly or erratically and entering the low power state is less likely to be successful or beneficial (e.g., save more power than the power consumed entering, during and existing the low power state). For example, if the monitoring of activity and analysis indicates that reasonable predictions can not be made regarding the probability that a threshold value is a good indication that entering a power reduction state is not likely to lead to wasted power consumption entering and existing the low power state, then the power management system can suspend entering low power states. The entering of low power states can be suspended until the monitoring of activity and analysis indicates that reasonable predictions can be made regarding the probability that a threshold value is a good indication that entering a power reduction state is not likely to lead to wasted power consumption entering and exiting the low power state.

Figure 7:
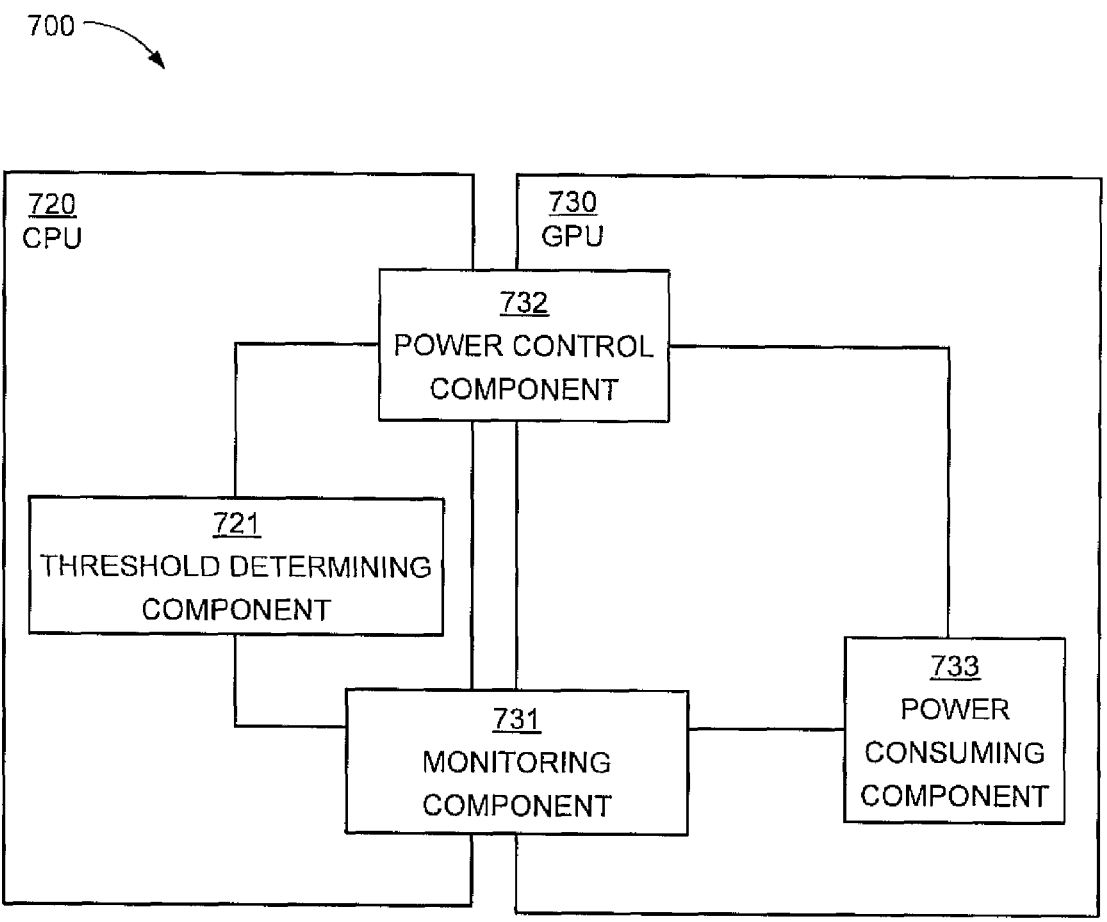
FIG. 7 is a block diagram showing an exemplary power management system within a portion of the computer system in accordance with one embodiment of the present invention.

FIG. 7 is a block diagram showing a power management system within a portion of the computer system, according to an embodiment of the present invention. In the current embodiment, the power consuming element 733 is located in the graphics processing unit GPU 730. The threshold-determining component 721 is located in the central processing unit CPU 720. Portions of the power control component 732 and the monitoring component 731 are located in the CPU 720 and the GPU 730. However, the components are not limited to these locations and may be located in alternate locations, including but not limited to, the GPU 730, the CPU 720, outside both the GPU 730 and the CPU 720, or combinations of the above. Furthermore, the components may be hardware, software, firmware, combinations of the above, etc.

In one embodiment, the power management system can determine when to power-gate in a variety of GPU operating modes:

during idle in a natively 3D operating system, in between rendering activities, during video playback, in between rendering of video frames, and during 3D rendering, in between rendering of 3D frames. However, a power management system can be applied to any power consuming element, operation, task, device, or system.

Thus, the present systems and methods facilitate efficient and effective power conservation. In one embodiment, a present system and method can facilitate minimization of adverse power reduction activities.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A power management method comprising:
performing an initiation metric determination process, wherein said initiation metric determination process includes:
performing an activity monitoring process;
performing, by a processor, a system architecture characteristic analysis in which a system architecture power-consumption break-even time (BE) is determined for the system;
establishing, by said processor, a power conservation initiation threshold value automatically; and
performing a power state adjustment process to an electronic system based on said threshold value.

2. The method of claim 1 wherein said adjusting operations comprises entering a low power state.

3. The method of claim 1 wherein said monitoring comprises collecting a histogram of previous idle period durations.

4. The method of claim 1 wherein said initiation metric determination process further comprises performing a system utilization analysis process in which idle period durations detected during said activity monitoring process are sorted into a variety of different length intervals and analyzed accordingly.

5. The method of claim 1 wherein said activity monitoring process includes tracking durations of component active operations and inactive operations.

6. The method of claim 1 further comprising suspending entrance of low power states when said activity monitoring process indicates an activity pattern is changing rapidly or erratically and entering the low power state is less likely to be successful.

7. A system of power management comprising:
a monitoring component that tracks power usage;
a threshold determining component, included in a processor, that establishes a threshold based on said power usage, wherein the threshold value includes examining the probability that initiating a power reduction operation saves more power than a power cost of entering and existing a power reduced state; and
a power control component that directs power consumption state adjustment of an electronic component based on said threshold.

8. The system of claim 7 wherein said power control component regulates power consumption by directing power-gating.

9. The system of claim 7 wherein said threshold determining component establishes said threshold such that time in a power reduction state conserves more power than is consumed entering said power reduction state.

10. The system of claim 7 wherein said threshold determining component comprises an idle detect counter that tracks respective idle period counts.

11. The system of claim 7 wherein said power control component directs power consumption state adjustment during a total idle time [I]; wherein said total idle time [I]=[X]+[Y1]+[P], wherein [X] is a duration in an inactive high power state, [Y1] is a duration while entering a low power state, and [P] is the duration at said low power level.

12. The system of claim 7 wherein an effective time at a low power level is determined based upon the equation [P']=[I]−[X]−[Y1]−[BE], wherein [BE] is a break even time and [P'] is a positive value.

13. The system of claim 12 wherein [Y1] and [BE] are characterized per system design and said threshold determining component calculates an idle filter setting associated with the idle start delay [X] for each total idle period [I].

14. A power management method comprising:
measuring idle of an electronic component;
binning said idle measurement, wherein said binning comprises counting idle periods that correspond to respective 2X clock cycles wherein X is a programmable number; and
automatically determining, by a processor, a threshold for said electronic component based on said binning.

15. The method of claim 14 further comprising setting a power level based on said threshold.

16. The method of claim 14 further comprising communicating said threshold to a power control component.

17. The method of claim 14 further comprising adjusting X based on clock frequency changes for different operating modes.

* * * * *